UNITED STATES PATENT OFFICE.

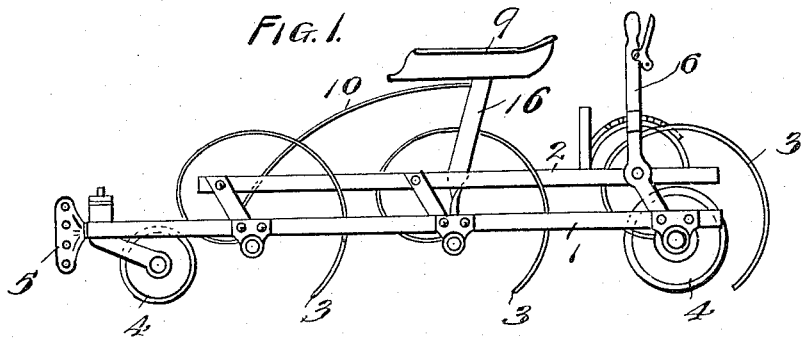
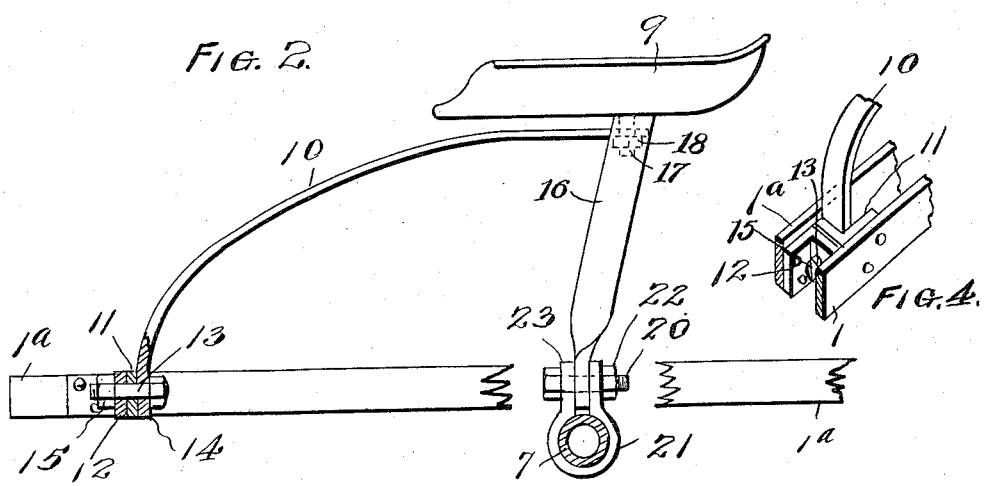
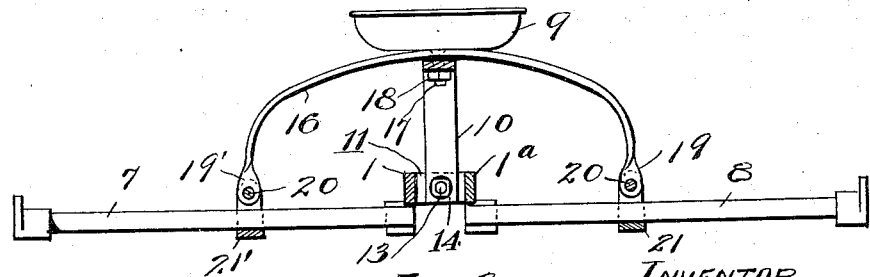

ORLANDO A. RIPLEY, OF LINDEN, MICHIGAN.

SPRING-SEAT.

1,149,292.

Specification of Letters Patent.

Patented Aug. 10, 1915.

Application filed October 30, 1913. Serial No. 798,246.

*To all whom it may concern:*

Be it known that I, ORLANDO A. RIPLEY, a citizen of the United States, residing at Linden, in the county of Genesee and State of Michigan, have invented certain new and useful Improvements in Spring-Seats, of which the following is a specification.

The present invention relates to improvements in spring seats, and is particularly applicable for use in connection with agricultural implements.

The primary object of the invention is the provision of a spring seat which may be attached to agricultural implements of the floating-spring tooth-drag type of land cultivators, and although the device is of course applicable for use in connection with other implements in this art I have, in the following specification and the accompanying drawings, shown the improved seat attached for use in connection with the sectional drag or cultivator.

There are at the present time numerous makes of sectional drags on the market, but difficulties have been encountered in devising a suitable seat for use with this particular class of implements, and customarily the implement is not equipped with a seat.

By the utilization of my invention I am enabled to construct a suitable and efficient spring seat with which this class of cultivator may be equipped, and which seat will perform the functions of a comparatively perfect device of this character.

In the accompanying drawings I have illustrated one complete example of the physical embodiment of my invention constructed according to the best mode I have so far devised for the practical application of the principles of the invention.

Figure 1 is a side elevation of a spring tooth-drag or cultivator equipped with the spring seat of my invention. Fig. 2 is an enlarged detail view showing some parts in section to more clearly illustrate the attachment of the spring seat to the frame of the implement. Fig. 3 is a rear view partly in section on the scale of that shown in Fig. 1, illustrating the seat attached to the implement frame. Fig. 4 is a perspective detail showing the front end of the spring tongue and its attachment to the frame bars of the sectional implement.

In the preferred embodiment of my invention I have equipped an implement having the usual frame bars 1 and 2 from which are supported the spring teeth 3, and the implement is furnished with the usual wheels 4, draft clevis 5, and an elevating lever 6. The frame of the implement includes the transverse bars 7 and 8, and the longitudinally extending bars 1 and $1^a$ to which the seat is attached.

In Fig. 3, it will be seen that the bars 7 and 1 are portions of the left section of the implement and bars 8 and $1^a$ are portions of the right section of the implement. The bars 1 and $1^a$ are suitably coupled to connect the sections of the implement, but as the bars 1 and $1^a$ and 7 and 8 are the only portions of the frame specifically involved in my invention, it is not necessary to illustrate the complete frame in detail.

The seat 9 is of metal as ordinarily constructed and of suitable size and is supported from the front by a spring tongue 10 which is attached between the longitudinal frame bars 1 and $1^a$ by means of a pair of angle irons 11 and 12, the former attached to the bar 1 and the latter attached to the bar $1^a$. These angle bars are perforated for the accommodation of a clamp bolt 13 which is passed therethrough and also through the perforated end 14 of the spring tongue 10, and a nut 15 is secured on to the end of the bolt to clamp the parts together. The rear end of the spring tongue is secured to a bridge member or yoke 16, by a bolt 17 and nut 18. This yoke is of approximately inverted U-shape and is firmly attached to the seat 9, while its perforated ends 19 and $19'$ are twisted at an angle to the plane of the yoke, perforated, and secured by a bolt as 20 to a clip 21 or $21'$ on the bar 8 or 7, as shown in Fig. 3.

A nut 22 clamps the ends of the yoke and the perforated ears 23 of the clips together, but the joint may be sufficiently loose to permit a lateral or swaying movement of the seat upon the yoke. The yoke 16 may also be of spring metal, and as thus constructed, the yoke and spring tongue which support the seat provide for a cushioning movement to absorb shocks and also to equalize any irregularities in the movement of the implement sections as the implement is dragged over the ground. Thus, the right section of the implement may be lifted above the altitude of the left section, but the yoke and tongue which support the seat will absorb the irregularity due to the position of the sections and the equilibrium of the seat will be maintained. Vertical shocks of the spring seat will of course, be absorbed by the spring tongue and U-shape yoke, and in this manner the spring seat of my invention performs the functions of a comparatively perfect device of this character.

From the above description taken in connection with the drawings it is believed I have provided an efficient and durable seat which is comparatively cheap in first cost and maintenance and which will be found a very desirable accessory for implements of the character referred to herein.

Having thus described my invention what I claim as new and desire to secure by Letters Patent, is:

The combination with the longitudinally and transversely extending frame bars of a sectional cultivator, of a laterally extending metallic spring yoke connecting said sections, and a seat fixed on the yoke, a clip on a transverse bar in each section of the cultivator, and clamping bolts attached to the clips and loosely connected to the perforated ends of the yoke, and a spring tongue attached at right angles to said yoke and connected to a longitudinally extending bar.

In testimony whereof I affix my signature in presence of two witnesses.

ORLANDO A. RIPLEY.

Witnesses:
CLAUDE E. HYATT,
WILLIAM H. GAMBER.

Copies of this patent may be obtained for five cents each, by addressing the "Commissioner of Patents, Washington, D. C."